United States Patent
Ahn et al.

(10) Patent No.: US 9,749,609 B2
(45) Date of Patent: Aug. 29, 2017

(54) METHOD AND APPARATUS FOR ENCODING A 3D MESH

(75) Inventors: Min Su Ahn, Yongin-si (KR); Chang Su Kim, Seoul (KR); Tae Hyun Rhee, Yongin-si (KR); Do Kyoon Kim, Yongin-si (KR); Dae Youn Lee, Seoul (KR); Jae Kyun Ahn, Seoul (KR)

(73) Assignees: Samsung Electronics Co., Ltd., Suwon-si (KR); Korea University Industrial & Academic Collarbortion, Seoul (KR)

( * ) Notice: Subject to any disclaimer, the term of this patent is extended or adjusted under 35 U.S.C. 154(b) by 816 days.

(21) Appl. No.: 14/005,749

(22) PCT Filed: Feb. 17, 2012

(86) PCT No.: PCT/KR2012/001197
§ 371 (c)(1),
(2), (4) Date: Jan. 29, 2014

(87) PCT Pub. No.: WO2012/124901
PCT Pub. Date: Sep. 20, 2012

(65) Prior Publication Data
US 2014/0168360 A1 Jun. 19, 2014

Related U.S. Application Data

(60) Provisional application No. 61/454,027, filed on Mar. 18, 2011, provisional application No. 61/453,684, filed on Mar. 17, 2011.

(30) Foreign Application Priority Data

May 26, 2011 (KR) ................. 10-2011-0050264

(51) Int. Cl.
*H04N 13/00* (2006.01)
*G06T 9/00* (2006.01)

(52) U.S. Cl.
CPC ......... *H04N 13/0048* (2013.01); *G06T 9/001* (2013.01)

(58) Field of Classification Search
CPC ................................................ H04N 13/0048
See application file for complete search history.

(56) References Cited

U.S. PATENT DOCUMENTS 6,046,744 A 4/2000 Hoppe
6,262,737 B1 * 7/2001 Li ........................... G06T 17/20
345/419

(Continued)

FOREIGN PATENT DOCUMENTS

JP 2003-514290 4/2003
KR 10-2003-0016477 3/2003

(Continued)

OTHER PUBLICATIONS

Yu et al. "Three-Dimensional Model Analysis and Processing," Springer Science and Business Media, ISBN: 978-3-642-12650-5, Feb. 3, 2011.*

(Continued)

*Primary Examiner* — Andy Rao
*Assistant Examiner* — Tyler Edwards
(74) *Attorney, Agent, or Firm* — NSIP Law

(57) ABSTRACT

Disclosed is a method and apparatus for encoding a three-dimensional (3D) mesh. The method for encoding the 3D mesh includes determining a priority of a gate configuring a 3D mesh corresponding to a 3D object, removing vertices configuring the 3D mesh using the determined priority of the gate, and simplifying the 3D mesh.

19 Claims, 6 Drawing Sheets

(56) References Cited

U.S. PATENT DOCUMENTS

| | | |
|---|---|---|
| 6,751,599 B2 | 6/2004 | Chang et al. |
| 6,798,411 B1 | 9/2004 | Gorman et al. |
| 2009/0263029 A1 | 10/2009 | Chang et al. |

FOREIGN PATENT DOCUMENTS

| | | |
|---|---|---|
| KR | 10-2003-0050308 | 6/2003 |
| KR | 10-2005-0006323 | 1/2005 |
| KR | 10-2006-0088136 | 8/2006 |
| KR | 10-2010-0112848 | 10/2010 |
| WO | WO 01/33512 A1 | 5/2001 |
| WO | WO 2009/128660 A2 | 10/2009 |

OTHER PUBLICATIONS

International Search Report mailed Sep. 26, 2012 in corresponding International Application No. PCT/KR2012/001197.
P. Hao et al., "Mesh Connectivity Compression for Progressive-to-Lossless Transmission," Jun. 2005, pp. 1-7.
P. Alliez et al., "Progressive Compression for Lossless Transmission of Triangle Meshes," Aug. 2001, pp. 195-202.

* cited by examiner

METHOD AND APPARATUS FOR ENCODING A 3D MESH

CROSS-REFERENCE TO RELATED APPLICATIONS

This application is a National Stage Entry of International Application No. PCT/KR2012/001197, filed on Feb. 17, 2012, which claims U.S. Provisional Application No. 61/454,027, filed on Mar. 18, 2011 and U.S. Provisional Application No. 61/453,684, filed on Mar. 17, 2011 and further claims priority under 35 U.S. C. §119(e) to Korean Application No. 10-2011-0050264, filed on May 26, 2011.

TECHNICAL FIELD

Example embodiments relate to a method and apparatus for encoding a three-dimensional (3D) mesh of a 3D object.

BACKGROUND ART

As of late, three-dimensional (3D) objects are being used in various fields of application such as games, digital movies, and computer-aided design (CAD). Such development in technology for rendering a real sensation has enabled the 3D objects to include hundreds or thousands of vertices and areas. However, the 3D mesh for restoring the 3D objects may require a vast storage capacity, a considerable amount of calculation, and a broad transmission bandwidth. Accordingly, there is a need for encoding and compressing the 3D mesh in order to efficiently transmit, store, and render the 3D objects.

The more complicated a form of the 3D objects, the more complicated a form of the 3D mesh. In addition, all information included in the 3D mesh may need to be transmitted to a decoder so as to restore the 3D objects. Such a method is referred to as a single rate coding.

A conventional method of the single rate coding may have a disadvantage in that a waiting time is required until vertex position information and vertex connectivity information are transmitted in full to restore the 3D objects because the information on the position of vertices configuring the 3D mesh and the information on the connectivity of vertices are transmitted sequentially.

Also, a progressive codec method in which a 3D mesh is progressively compressed and transmitted may be suggested. However, a conventional progressive codec method has a lower compression rate than the single rate coding because additional information is included in the progressive codec method.

Accordingly, there is a desire for technology for enhancing a compression rate when a 3D mesh is progressively compressed.

DISCLOSURE OF INVENTION

Technical Solutions

According to an aspect of the present invention, there is provided a method for encoding a three-dimensional (3D) mesh, the method including simplifying a 3D mesh using a priority of a gate configuring the 3D mesh, and encoding connectivity information of a vertex removed from a plurality of vertices configuring the 3D mesh through the simplifying.

The simplifying of the 3D mesh may include determining the priority of the gate using at least one of tag information and valence information on both end vertices configuring the gate, and removing a front vertex connected to the both end vertices configuring the gate, based on the determined priority.

The removing of the front vertex may include generating a triangle using the both end vertices configuring the gate and the front vertex, generating tag information associated with neighboring vertices of the front vertex, and updating valence information of the neighboring vertices of the front vertex.

The simplifying of the 3D mesh may include determining whether a patch associated with the gate and the front vertex is a null patch, and determining a priority of the gate associated with the patch determined to be the null patch to be lower than a priority of the gate associated with the patch determined not to be the null patch.

The simplifying of the 3D mesh may include determining a start gate based on position information and valence information on the plurality of vertices configuring the 3D mesh, and simplifying the 3D mesh by removing a front vertex of the start gate, based on the start gate.

The simplifying of the 3D mesh by removing the front vertex of the start gate may include generating a triangle by connecting neighboring vertices of the front vertex subsequent to the removing of the front vertex of the start gate, determining edges remaining subsequent to the generating of the triangle from among edges configuring an area adjacent to the front vertex of the start gate to be a plurality of subsequent gates, and determining a priority of the plurality of subsequent gates.

According to an aspect of the present invention, there is provided an apparatus for encoding a three-dimensional (3D) mesh, the apparatus including a mesh simplifier to simplify a 3D mesh using a priority of a gate configuring the 3D mesh, and a mesh encoder to encode connectivity information on a vertex removed from a plurality of vertices configuring the 3D mesh through the simplifying.

The mesh simplifier may include a priority determiner to determine the priority of the gate using at least one of tag information and valence information on both end vertices configuring the gate, and a vertex remover to remove a front vertex connected to the both end vertices configuring the gate based on the determined priority.

The mesh simplifier may include a start gate determiner to determine a start gate based on position information and valence information on the plurality of vertices configuring the 3D mesh, and a vertex remover to remove the front vertex of the start gate based on the start gate.

Effects of the Invention

According to example embodiments, it is possible to enhance a compression efficiency by determining a priority of a plurality of gates, and based on a sequential order from a gate of which the determined priority is high, simplifying a three-dimensional (3D) mesh.

BEST MODE FOR CARRYING OUT THE INVENTION

Figure 1:
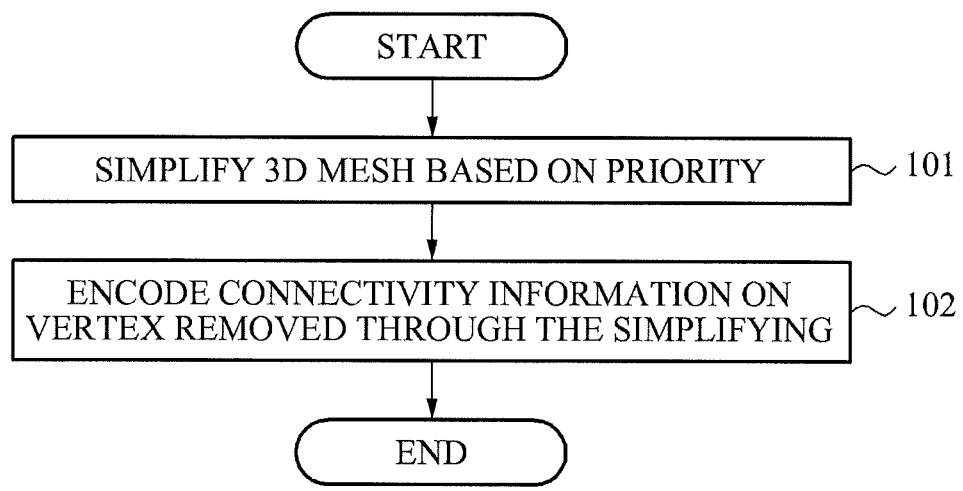
FIG. 1 is a flowchart illustrating a method for encoding a three-dimensional (3D) mesh in an apparatus for encoding a 3D mesh according to example embodiments.

Reference will now be made in detail to example embodiments, examples of which are illustrated in the accompanying drawings, wherein like reference numerals refer to the like elements throughout. Example embodiments are described below in order to explain example embodiments by referring to the figures. A method for encoding a three-dimensional (3D) mesh may be performed by an apparatus for encoding a 3D mesh.

FIG. 1 is a flowchart illustrating a method for encoding a 3D mesh in an apparatus for encoding a 3D mesh according to example embodiments.

In operation 101, the apparatus for encoding the 3D mesh simplifies a 3D mesh based on a priority of a plurality of gates. In this example, the apparatus for encoding the 3D mesh progressively simplifies the 3D mesh for a plurality of levels. Hereinafter, a gate refers to a line having a linear shape formed by connecting vertices configuring a 3D mesh, and serving as a reference line simplifying the 3D mesh.

For one example, the apparatus for encoding the 3D mesh removes a front vertex of a gate. Also, the apparatus for encoding the 3D mesh simplifies the 3D mesh by re-connecting neighboring vertices adjacent to the removed front vertex. For example, the apparatus for encoding the 3D mesh removes the front vertex, and generates a triangle by connecting the neighboring vertices to one another.

In operation 102, the apparatus for encoding the 3D mesh encodes connectivity information on the removed front vertex. In this example, the connectivity information on the removed front vertex refers to a type of vertex configuring an area formed when the neighboring vertices adjacent to the front vertex are connected.

More particularly, the apparatus for encoding the 3D mesh classifies the 3D mesh into a fine form of mesh and a simple form of mesh for the plurality of levels. In this example, a 3D mesh in a lower level may indicate a simpler form than a 3D mesh in an upper level because a number of vertices configuring the 3D mesh in the lower level is fewer than a number of vertices configuring the 3D mesh in the upper level. In particular, the 3D mesh in the upper level has a form closer to an original of a 3D object than the 3D mesh in the lower level.

By way of example, the apparatus for encoding the 3D mesh sets connectivity information and position information associated with a base mesh of the 3D mesh to a level 0. Hereinafter, the base mesh refers to a 3D mesh of a lowest level, and a simplest form in which an area is configured by connecting vertices. The apparatus for encoding the 3D mesh encodes connectivity information and position information on vertices removed from vertices configuring a mesh at a current level, based on vertices configuring a mesh at a preceding level. Hereinafter, the position information on the vertices may be represented by geometry information, and refers to a 3D position coordinate of vertices configuring a 3D mesh.

Figure 2:
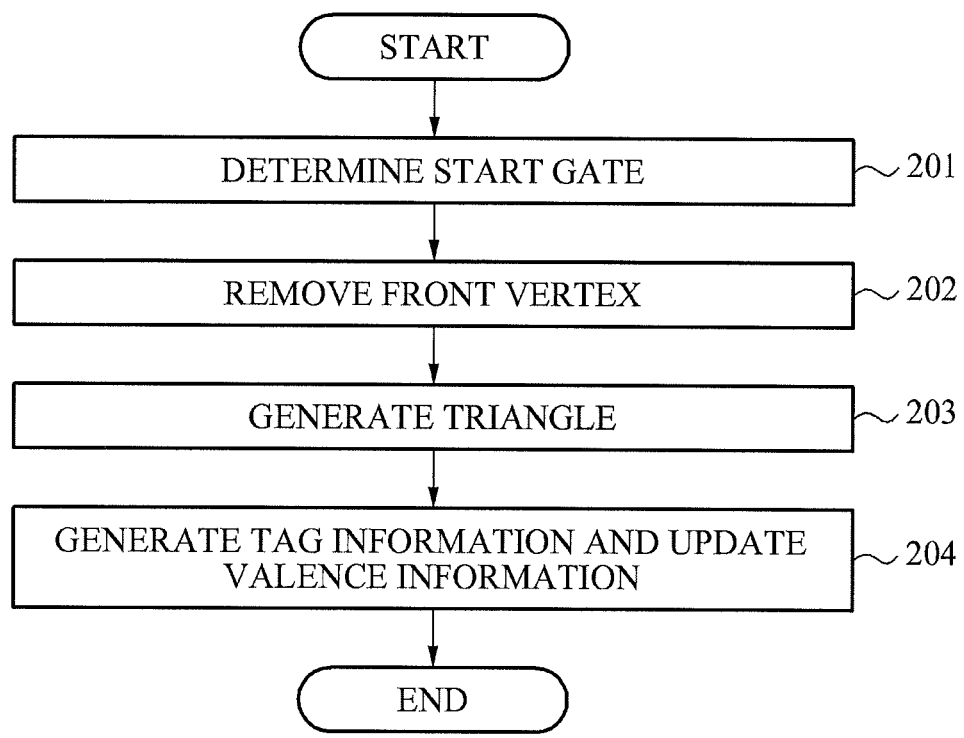
FIG. 2 is a flowchart illustrating an operation of simplifying a 3D mesh in an apparatus for encoding a 3D mesh according to example embodiments.

FIG. 2 is a flowchart illustrating an operation of simplifying a 3D mesh in an apparatus for encoding a 3D mesh according to example embodiments.

Referring to FIG. 2, in operation 201, the apparatus for encoding the 3D mesh determines a start gate using a plurality of vertices configuring a 3D mesh.

In this example, the apparatus for encoding the 3D mesh determines the start gate using position information and valence information on the plurality of vertices configuring the 3D mesh. Here, the valence information includes a number of vertices connected by a vertex and a single edge.

In operation 202, the apparatus for encoding the 3D mesh removes a front vertex of the start gate. As such, the apparatus for encoding the 3D mesh removes the front vertex, and simplifies a patch associated with the start gate. For example, referring to FIG. 3, the patch 300 includes a front vertex 302 prior to the removal and areas formed by connecting a plurality of neighboring vertices.

In operation 203, subsequent to the removal of the front vertex of the start gate, the apparatus for encoding the 3D mesh generates a triangle by connecting the plurality of neighboring vertices adjacent to the front vertex. As such, the apparatus for encoding the 3D mesh simplifies the 3D mesh by removing the front vertex, and generating the triangle. For example, the apparatus for encoding the 3D mesh simplifies the 3D mesh by reducing a number of vertices configuring the 3D mesh and a number of areas formed by connecting vertices.

In operation 204, when the triangle is generated, the apparatus for encoding the 3D mesh generates tag information on vertices configuring a patch, and updates valence information on boundary vertices. In this example, the tag information indicates whether a number of neighboring vertices connected to the boundary vertices is decreased, increased, or remains the same.

Figure 4:
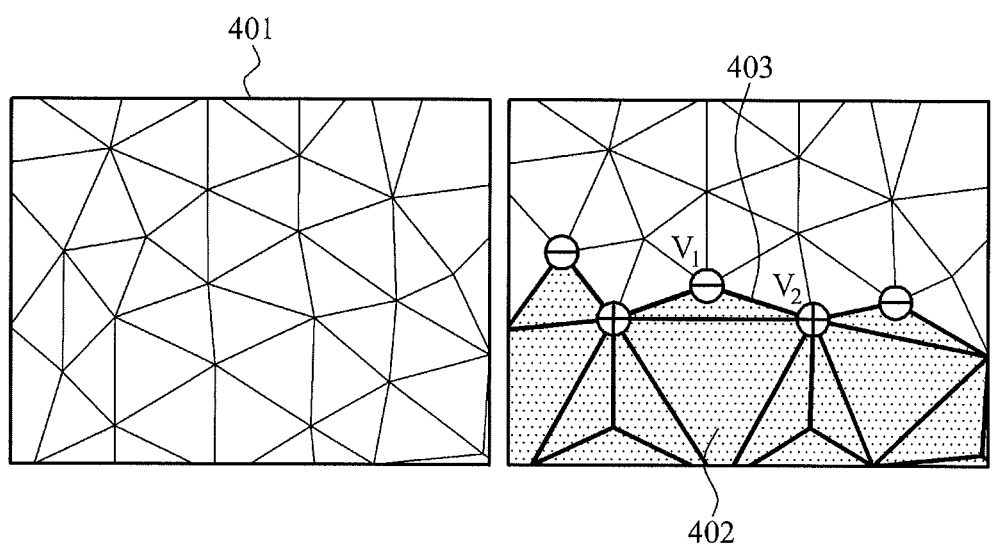
FIG. 4 is a diagram illustrating tag information generated by simplifying a 3D mesh according to example embodiments.

For example, referring to FIG. 4, when a number of vertices connected to a boundary vertex subsequent to the generation of the triangle is increased or remains the same in comparison to a number of vertices connected to a boundary vertex prior to the generation of the triangle, the apparatus for encoding the 3D mesh generates tag information on a plus type 402. Conversely, when the number of vertices connected to the boundary vertex subsequent to the generation of the triangle is reduced in comparison to the number of vertices connected to the boundary vertex prior to the generation of the triangle, the apparatus for encoding the 3D mesh generates tag information on a minus type 401. The apparatus for encoding the 3D mesh updates the valence information to the number of vertices connected to the boundary vertex subsequent to the generation of the triangle.

Figure 3:
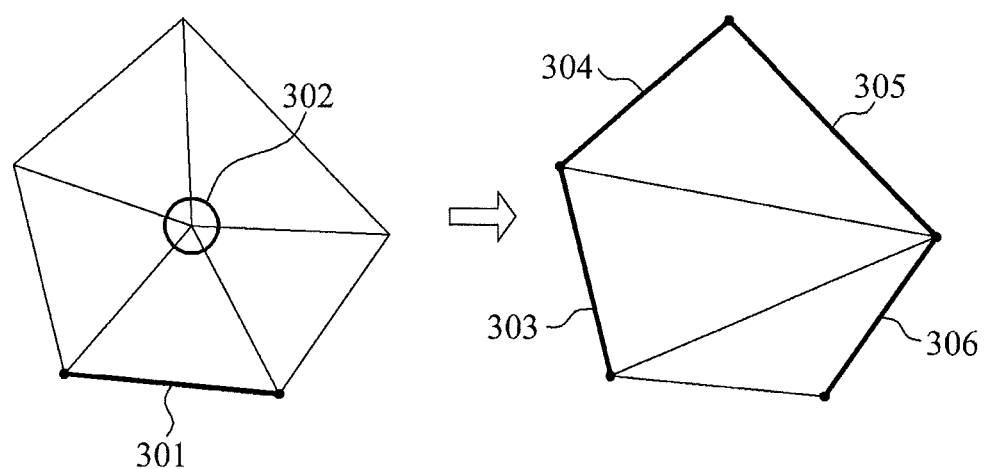
FIG. 3 is a diagram illustrating a 3D mesh simplified by removing a front vertex and generating a triangle according to example embodiments.

FIG. 3 is a diagram illustrating a 3D mesh simplified by removing a front vertex and generating a triangle according to example embodiments.

Referring to FIG. 3, an apparatus for encoding a 3D mesh removes a front vertex 302 connected to both end vertices of a start gate 301 from among vertices configuring the start gate 301. Also, the apparatus for encoding the 3D mesh encodes connectivity information between a front vertex 302 prior to being removed and neighboring vertices following the front vertex 302 being removed.

When the front vertex 302 is removed, the apparatus for encoding the 3D mesh generates a triangle by connecting neighboring vertices of the front vertex 302. As such, a number of triangles generated is reduced to 3 by removing the front vertex 302, resulting in the 3D mesh being simplified.

In this example, the apparatus for encoding the 3D mesh determines edges remaining subsequent to removing the front vertex and generating the triangle, from among edges configuring areas adjacent to the front vertex 302 of the start gate to be gates for removing a subsequent vertex. In particular, when the triangle is generated, the apparatus for encoding the 3D mesh determines edges 303 through 306 configuring the generated triangle to be subsequent gates for simplifying the 3D mesh. Here, the edges have a linear shape formed by connecting vertices, and more particularly, an edge functioning as a reference for simplifying the 3D mesh from among the edges may become a gate.

FIG. 4 is a diagram illustrating tag information generated by simplifying a 3D mesh according to example embodiments.

Referring to FIG. 4, when simplifying 402 is performed on a portion of a 3D mesh 401, an apparatus for encoding a 3D mesh generates tag information on neighboring vertices of a front vertex removed when a triangle is generated. Also, with the triangle being generated, the apparatus for encoding the 3D mesh updates valence information on the neighboring vertices of the front vertex removed when the triangle is generated. In this example, the neighboring vertices refer to vertices connected to the front vertex prior to removing the front vertex, and include both end vertices configuring a gate.

For example, the apparatus for encoding the 3D mesh generates the tag information through the simplifying both end vertices $v_1$ and $v_2$ configuring a gate 403. In this example, referring to an area 402 on which the simplifying is performed, the apparatus for encoding the 3D mesh generates tag information of a minus type because a number of vertices connected to the vertex $v_1$ is reduced to 2 when the simplifying is performed. Also, the apparatus for encoding the 3D mesh updates valence information on the vertex $v_1$ from 6 to 5.

Similarly, the apparatus for encoding the 3D mesh generates tag information of a plus type because a number of vertices connected to the vertex $v_2$ is increased from 5 to 7 within the area 402 on which the simplifying is performed. In this example, the apparatus for encoding the 3D mesh updates the valence information on the vertex $v_2$ from 6 to 8.

Figure 5:
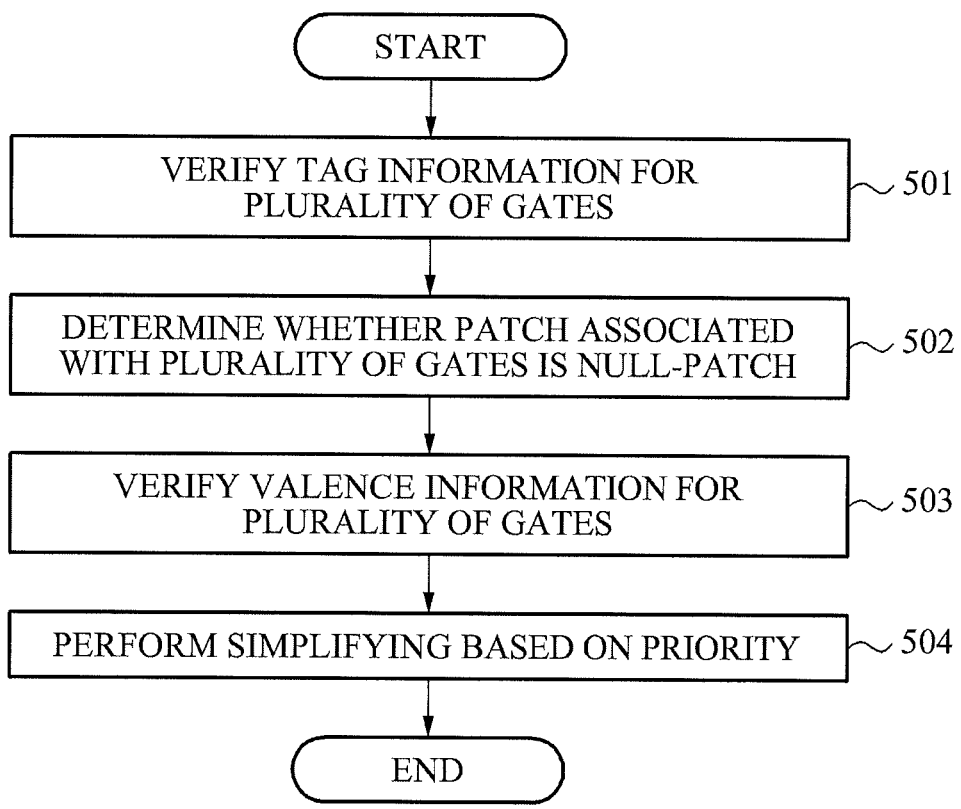
FIG. 5 is a flowchart illustrating an operation of determining a priority of a gate in an apparatus for encoding a 3D mesh according to example embodiments.

FIG. 5 is a flowchart illustrating an operation of determining a priority of a gate in an apparatus for encoding a 3D mesh according to example embodiments.

Referring to FIG. 5, the apparatus for encoding the 3D mesh verifies tag information of a plurality of gates and whether a patch associated with the plurality of gates is a null-patch, and determines a priority of the plurality of gates using valence information on the plurality of gates.

In operation 501, the apparatus for encoding the 3D mesh verifies tag information on a plurality of gates configuring a 3D mesh, and determines a priority.

For one example, the apparatus for encoding the 3D mesh determines edges remaining subsequent to performing simplifying based on a start gate, from among edges representing an area adjacent to a front vertex of the start gate to be a plurality of gates for removing a subsequent vertex. Transitively, the apparatus for encoding the 3D mesh verifies tag information on the plurality of gates for removing the subsequent vertex.

In this example, the apparatus for encoding the 3D mesh determines a higher priority when both end vertices configuring the plurality of gates include tag information differing from one another than when the both end vertices configuring the plurality of gates include tag information identical to one another. In particular, when tag information on one of both end vertices, for example, $v_1$, configuring a gate 1 is a minus type, and tag information on another of the both end vertices, for example, $v_2$, is a plus type, and tag information on one of both end vertices, for example, $v_3$, configuring a gate 2 is a minus type, and another of the both end vertices, for example, $v_4$, is a minus type, the apparatus for encoding the 3D mesh determines a priority of the gate 1 to be higher than a priority of the gate 2. Thus, the apparatus for encoding the 3D mesh determines a higher priority when tag information on a gate is (minus, plus) type or (plus, minus) type than when tag information on a gate is (plus, plus) type or (minus, minus) type.

In operation 502, the apparatus for encoding the 3D mesh determines whether a patch associated with a plurality of gates is a null-patch, and determines a priority of the plurality of gates.

For one example, when a front vertex of a gate corresponds to another gate of a different patch, the apparatus for encoding the 3D mesh determines a patch associated with the gate to be a null-patch.

For another example, when connectivity information on neighboring vertices adjacent to the front vertex of the gate is abnormal, the apparatus for encoding the 3D mesh determines the patch associated with the gate to be the null-patch. As such, when the patch is determined to be the null-patch, a compression rate may be reduced because the front vertex is not removed.

Consequently, the apparatus for encoding the 3D mesh determines a lower priority when the patch associated with the gate is the null-patch than when the patch associated with the gate is not the null-patch. By way of example, when a patch associated with the gate 1 is a null-patch, and a patch associated with the gate 2 is not the null-patch, the apparatus for encoding the 3D mesh determines the priority of the gate 1 to be lower than the priority of the gate 2. As such, the apparatus for encoding the 3D mesh determines the priority of the null-patch to be lower than those unassociated with the null-patch, and performs simplifying in a sequential order from a higher priority so as to increase a compression rate.

In operation 503, the apparatus for encoding the 3D mesh verifies valence information on a plurality of gates, and determines a priority. In this example, the apparatus for encoding the 3D mesh compares valence information on both end vertices configuring the plurality of gates. As a result of the comparison, the apparatus for encoding the 3D mesh determines a higher priority of a corresponding gate for lower valence information.

For one example, when both end vertices of a gate 1 are $v_1$ and $v_2$, both end vertices of a gate 2 are $v_3$ and $v_4$, and valence information on the vertex $v_1$ is 2, valence information on the vertex $v_2$ is 7, valence information on the vertex $v_3$ is 3, and valence information on the vertex $v_4$ is 7, the apparatus for encoding the 3D mesh selects the vertex $v_1$ having lower valence information from among the both end vertices of the gate 1. Similarly, the apparatus for encoding the 3D mesh selects the vertex $v_3$ from among the both end vertices of the gate 2. Also, the apparatus for encoding the 3D mesh compares the valence information on the vertex $v_1$ configuring the gate 1 and the valence information on the vertex $v_3$ configuring the gate 2. Further, the apparatus for encoding the 3D mesh determines the priority of the gate 1 having the lower valence information to be higher than the priority of the gate 2.

For another example, the apparatus for encoding the 3D mesh determines a priority using an average of valence information on both end vertices. In particular, when the both end vertices of the gate 1 are $v_1$ and $v_2$ and the both end vertices of the gate 2 are $v_2$ and $v_3$, and the valence information of the vertex $v_1$ is 5, the valence information of the vertex $v_2$ is 3, and the valence information of the vertex $v_3$ is 7, the vertex $v_2$ having the lower valence information from among the both end vertices of the gate 1 corresponds to a vertex having the lower valence information from among the both end vertices of the gate 2. Accordingly, the apparatus for encoding the 3D mesh compares an average 4 of the valence information on the vertices $v_1$ and $v_2$ and an average 5 of the valence information on the vertices $v_2$ and $v_3$. As a result of the comparison, the apparatus for encoding the 3D mesh determines the priority of the gate 1 having the smaller average of the valence information than the average of the gate 2 to be higher than the priority of the gate 2.

In operation 504, the apparatus for encoding the 3D mesh simplifies a 3D mesh based on a plurality of gates in the determined priority.

The apparatus for encoding the 3D mesh encodes the simplified 3D mesh, for example, a base mesh. In this example, the apparatus for encoding the 3D mesh encodes connectivity information on vertices removed when the 3D mesh is simplified. Also, the apparatus for encoding the 3D mesh encodes tag information and valence information generated by the simplifying of the 3D mesh.

The apparatus for encoding the 3D mesh of FIG. 5 determines a priority of the plurality of gates by verifying whether a patch associated with the plurality of gates is a null-patch when determining the priority solely based on tag information on the plurality of gates is difficult.

For example, when tag information of the gate 1 and the gate 2 is identical, the apparatus for encoding the 3D mesh verifies whether a patch associated with the gate 1 and a patch associated with the gate 2 are a null-patch, and determines the priorities of the gate 1 and the gate 2.

Also, when determining the priority of the plurality of gates is difficult by verifying the tag information and whether the patch associated with the gate is the null-patch, the apparatus for encoding the 3D mesh determines the priority of the plurality of gates, using valence information on both end vertices configuring the plurality of gates.

For example, when tag information of the gate 1 and the gate 2 is identical, and the patch associated with the gate 1 and the patch associated with the gate 2 are not the null-patch, the apparatus for encoding the 3D mesh determines the priority of the plurality of gates, using valence information on both end vertices configuring the gate 1 and valence information on both end vertices configuring the gate 2.

Figure 6:
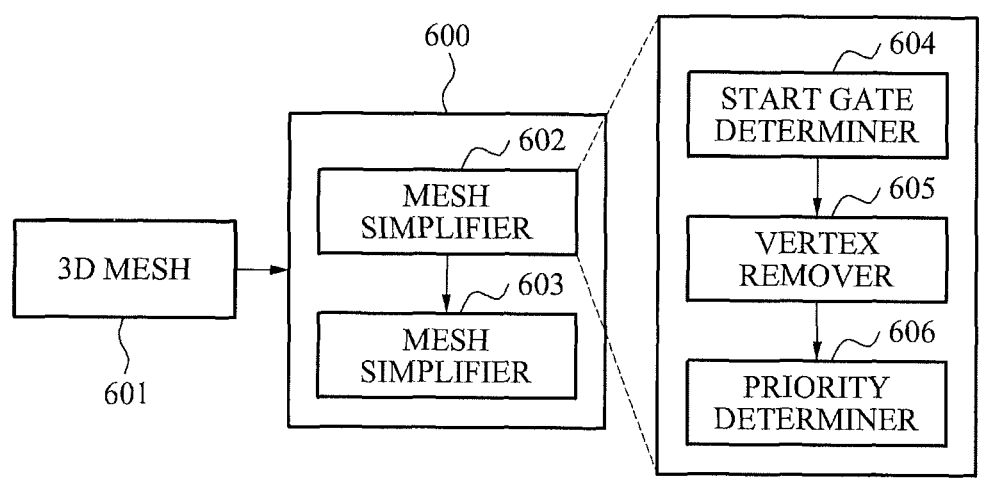
FIG. 6 is a block diagram illustrating a configuration of an apparatus for encoding a 3D mesh according to example embodiments.

FIG. 6 is a block diagram illustrating a configuration of an apparatus 600 for encoding a 3D mesh according to example embodiments.

Referring to FIG. 6, the apparatus 600 for encoding the 3D mesh includes a mesh simplifier 602 and a mesh encoder 603.

The mesh simplifier 602 simplifies a 3D mesh corresponding to a 3D object. In this example, the mesh simplifier 602 simplifies the 3D mesh for a plurality of levels, using a priority of a gate configuring the 3D mesh. Further, the mesh simplifier 602 includes a start gate determiner 604, a vertex remover 605, and a priority determiner 606.

The start gate determiner 605 determines a start gate, based on position information and valence information on a plurality of vertices configuring a 3D mesh. Hereinafter, the position information on the plurality of vertices may be represented by geometry information, and refers to a 3D position coordinate of a vertex configuring a 3D mesh. The valence information on the plurality of vertices includes a number of vertices connected to a vertex.

The vertex remover 605 removes a front vertex of the start gate, based on the start gate. Also, the vertex remover 605 generates a triangle by connecting a plurality of neighboring vertices connected to the front vertex. In this example, the vertex remover 605 determines edges remaining subsequent to the removing of the front vertex from among edges configuring an area adjacent to the front vertex of the start gate to be a plurality of subsequent gates. The priority determiner 606 determines a priority of the plurality of subsequent gates. Here, the edges have a linear shape formed by connecting vertices, and more particularly, an edge functioning as a reference for simplifying the 3D mesh from among the edges may become a gate.

Also, the vertex remover 605 generates tag information on the plurality of neighboring vertices connected to the front vertex when the triangle is generated. In this example, the tag information includes a plus type or a minus type indicating whether a number of the plurality of neighboring vertices connected to a boundary vertex is decreased, increased, or remains the same. In addition, the vertex remover 605 updates the valence information on the plurality of neighboring vertices when the triangle is generated.

The priority determiner 606 determines a priority of a gate using at least one of tag information and valence information on both end vertices configuring a gate. In this example, the priority determiner 606 determines the priority by determining whether a patch associated with the gate is a null-patch.

For one example, the priority determiner 606 determines a higher priority of a gate when both end vertices include tag information differing from one another than when the both end vertices include tag information identical to one another.

For another example, the priority determiner 606 determines a lower priority of the gate when a patch associated with the gate is a null-patch than when the patch associated with the gate is not the null-patch. In particular, when a front vertex of a gate 1 is a gate 2 of another patch, the priority determiner 606 determines a patch associated with the gate 1 to be the null-patch. Also, the priority determiner 606 determines the priority of the gate associated with the null-patch to be lower than the priority of the gate unassociated with the null-patch.

For still another example, the priority determiner 606 determines a higher priority of a gate for lower valence information on vertices configuring the gate. For example, the priority determiner 606 compares valence information on both end vertices configuring a plurality of gates. Also, as a result of the comparison, the priority determiner 606 determines a higher priority for lower valence information.

In a subsequent step, the vertex remover 605 removes a front vertex of the plurality of gates based on the determined priority, generates a triangle, and simplifies a 3D mesh. For example, the vertex remover 605 removes the front vertex in a sequential order from a higher priority.

The mesh encoder 603 encodes connectivity information on vertices removed through the simplifying, from among the vertices configuring the 3D mesh. For example, the mesh encoder 603 encodes a base mesh. Also, the mesh encoder 603 encodes geometry information on the removed front vertex. Further, the mesh encoder 603 encodes the generated tag information and valence information.

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. A method for encoding a three-dimensional (3D) mesh, the method comprising:
    determining a priority of a gate configuring a 3D mesh based on valence information on boundary vertices, tag information on vertices configuring a patch, and a null patch;
    simplifying a 3D mesh by removing a vertex based on the priority of the gate; and
    encoding connectivity information of a vertex removed from a plurality of vertices configuring the 3D mesh through the simplifying the 3D mesh,
    wherein the simplifying of the 3D mesh comprises:
        generating tag information including a plus type on a boundary vertex when a number of vertices connected to the corresponding boundary vertex subsequent to a generation of a triangle is increased or remains the same in comparison to a number of vertices connected to the corresponding boundary vertex prior to the generation of the triangle;
        generating tag information including a minus type on the boundary vertex when the number of vertices connected to the corresponding boundary vertex subsequent to the generation of the triangle is reduced in comparison to the number of vertices connected to the corresponding boundary vertex prior to the generation of the triangle; and
        determining a higher priority of the gate when tag information on both vertices configuring the gate include minus-plus type or plus-minus type than when tag information on the both vertices configuring the gate include plus-plus type or minus-minus type.

2. The method of claim 1, wherein the simplifying of the 3D mesh comprises:
    removing a front vertex of the gate, based on the priority.

3. The method of claim 2, wherein the removing of the front vertex comprises:
    generating a triangle of the patch, subsequent to the removing of the front vertex;
    generating tag information associated with neighboring vertices of the front vertex; and
    updating valence information of the neighboring vertices of the front vertex.

4. The method of claim 1, wherein the determining the priority of a gate comprises:
    determining a higher priority to the gate for lower valence information on the both vertices configuring the gate.

5. The method of claim 1, wherein the simplifying the 3D mesh comprises:
    determining a priority of the gate associated with the patch determined to be the null patch to be lower than a priority of the gate associated with the patch determined not to be the null patch.

6. The method of claim 5, wherein the simplifying the 3D mesh further comprises:
    determining the patch associated with the front vertex to be the null patch when the front vertex is a vertex configuring another gate.

7. The method of claim 1, wherein the simplifying of the 3D mesh comprises:
    determining a higher priority of the gate when both vertices configuring the gate include tag information differing from one another than a priority when the both vertices include tag information identical to one another.

8. The method of claim 1, wherein the simplifying of the 3D mesh comprises:
    determining a start gate with a highest priority; and
    simplifying the 3D mesh by removing a front vertex of the start gate.

9. The method of claim 1, wherein the simplifying of the 3D mesh by removing the front vertex of the start gate comprises:
    generating a triangle by connecting neighboring vertices of the front vertex subsequent to the removing of the front vertex of the start gate;
    determining edges remaining subsequent to the generating of the triangle from among edges configuring an area adjacent to the front vertex of the start gate to be a plurality of subsequent gates; and
    determining a priority of the plurality of subsequent gates.

10. An apparatus for encoding a three-dimensional (3D) mesh, the apparatus comprising:
    a priority determiner to determine a priority of a gate configuring a 3D mesh based on valence information on boundary vertices, tag information on vertices configuring a patch, and a null patch;
    a mesh simplifier to simplify a 3D mesh by removing a vertex based on the priority of the gate; and
    a mesh encoder to encode connectivity information on a vertex removed from a plurality of vertices configuring the 3D mesh through the simplifying the 3D mesh,
    wherein the mesh simplifier is further configured to:
        generate tag information including a plus type on a boundary vertex when a number of vertices connected to the corresponding boundary vertex subsequent to a generation of a triangle is increased or remains the same in comparison to a number of vertices connected to the corresponding boundary vertex prior to the generation of the triangle;
        generate tag information including a minus type on the boundary vertex when the number of vertices connected to the corresponding boundary vertex subsequent to the generation of the triangle is reduced in comparison to the number of vertices connected to the corresponding boundary vertex prior to the generation of the triangle; and determine a higher priority of the gate when tag information on both vertices configuring the gate include minus-plus type or plus-minus type than when tag information on the both vertices configuring the gate include plus-plus type or minus-minus type.

11. The apparatus of claim 10, wherein the mesh simplifier comprises:

a vertex remover to remove a front vertex of the gate based on the priority.

12. The apparatus of claim 11, wherein the vertex remover generates a triangle of the patch, subsequent to the removing of the front vertex, generates tag information of a plurality of neighboring vertices connected to the front vertex, and updates valence information of the plurality of neighboring vertices of the front vertex.

13. The apparatus of claim 10, wherein the priority determiner determines a higher priority to the gate for lower valence information on both vertices configuring the gate.

14. The apparatus of claim 10, wherein the priority determiner determines a priority of the gate associated with the patch determined to be the null patch to be lower than a priority of the gate associated with the patch determined not to be the null patch.

15. The apparatus of claim 14, wherein the priority determiner determines the patch associated with the front vertex to be the null patch when the front vertex is a vertex configuring another gate.

16. The apparatus of claim 10, wherein the mesh simplifier determines a higher priority when both vertices configuring the gate includes tag information differing from one another than a priority when the both vertices includes tag information identical to one another.

17. The apparatus of claim 10, wherein the mesh simplifier comprises:

a start gate determiner to determine a start gate with a highest priority; and a vertex remover to remove the front vertex of the start gate.

18. The apparatus of claim 17, wherein the vertex remover removes the front vertex of the start gate, generates a triangle by connecting neighboring vertices of the front vertex of the start gate, and determines edges remaining subsequent to the generating of the triangle from among edges configuring an area adjacent to the front vertex of the start gate to be a plurality of subsequent gates.

19. The apparatus of claim 18, wherein the mesh simplifier further comprises:

a priority determiner to determine a priority of the plurality of subsequent gates.

* * * * *